United States Patent
Kim et al.

(10) Patent No.: US 11,491,745 B2
(45) Date of Patent: Nov. 8, 2022

(54) APPARATUS AND METHOD FOR LAMINATING FIBERS FOR DIRECT MANUFACTURING OR PREFORM

(71) Applicant: HIGH IN TECH CO., LTD., Ulsan (KR)

(72) Inventors: Hyun Deuk Kim, Seogwipo-si (KR); Seon Hee Yoon, Ulsan (KR)

(73) Assignee: HIGH IN TECH CO., LTD., Ulsan (KR)

( * ) Notice: Subject to any disclaimer, the term of this patent is extended or adjusted under 35 U.S.C. 154(b) by 0 days.

(21) Appl. No.: 16/463,410

(22) PCT Filed: Nov. 28, 2017

(86) PCT No.: PCT/KR2017/013694
§ 371 (c)(1),
(2) Date: May 23, 2019

(87) PCT Pub. No.: WO2019/107579
PCT Pub. Date: Jun. 6, 2019

(65) Prior Publication Data
US 2020/0376780 A1 Dec. 3, 2020

(51) Int. Cl.
*B29C 70/06* (2006.01)
*B29C 70/38* (2006.01)
(Continued)

(52) U.S. Cl.
CPC ............ *B29C 70/382* (2013.01); *B29B 11/12* (2013.01); *B29B 11/16* (2013.01); *B29C 70/06* (2013.01); *B29C 70/48* (2013.01)

(58) Field of Classification Search
CPC ....... B29C 70/382; B29C 70/06; B29C 70/48; B29B 11/12; B29B 11/16
(Continued)

(56) References Cited

U.S. PATENT DOCUMENTS 8,312,907 B2  11/2012  Yoshikawa et al.
8,771,567 B2   7/2014  Piepenbrock et al.
(Continued)

FOREIGN PATENT DOCUMENTS

CN    104354302 B   6/2016
JP       2902368 B   6/1999
(Continued)

OTHER PUBLICATIONS

Korean Office Action issued in corresponding Korean Patent Application No. 10-2017-0126172 dated Jul. 22, 2019.
(Continued)

*Primary Examiner* — Christina A Johnson
*Assistant Examiner* — Xue H Liu
(74) *Attorney, Agent, or Firm* — Finch & Maloney PLLC

(57) ABSTRACT

An apparatus and method for laminating fibers for direct manufacturing of a preform, in which rows of fibers are drawn at the same time and are arranged in the form of a preform.

The apparatus for laminating fibers for direct manufacturing of a preform according to an aspect of the present invention is an apparatus which supplies reinforced fibers to a table 22 and laminating the reinforced fibers thereon, so as to manufacture a fiber preform by laminating the reinforced fibers on the table 22, the apparatus including: a reinforced fiber supply robot 30 configured to supply a predetermined length of a plurality of reinforced fibers, on which a thermoplastic resin is coated; at least one or more edge fixing robots 40 configured to press and fix an end of the reinforced fibers drawn from the reinforced fiber supply robot 30 to the table 22 while the reinforced fibers are adhered as the thermoplastic resin is melted.

Particularly, the reinforced fiber supply robot 30 includes: a plurality of reels 33, around which the reinforced fibers F coated with the thermoplastic resin are wound; a plurality of supply rollers 34 configured to transfer the reinforced fibers F, drawn from the plurality of reels, to the table 22 to supply the reinforced fibers thereto; a cutter configured to cut the reinforced fibers F, supplied through the plurality of supply rollers 34, into a predetermined length; and a compression roller 37 configured to press the end of the reinforced fibers F, cut by the cutter, to the table 22.

20 Claims, 7 Drawing Sheets

(51) Int. Cl.
    *B29B 11/12*     (2006.01)
    *B29B 11/16*     (2006.01)
    *B29C 70/48*     (2006.01)

(58) Field of Classification Search
    USPC .......................................................... 264/138
    See application file for complete search history.

(56) References Cited

U.S. PATENT DOCUMENTS

| | | |
|---|---|---|
| 9,108,365 B2 | 8/2015 | Barlag |
| 9,782,926 B2 | 10/2017 | Witzel et al. |
| 2017/0291377 A1 | 10/2017 | Tsuji et al. |

FOREIGN PATENT DOCUMENTS

| | | |
|---|---|---|
| JP | 2005-219373 A | 8/2005 |
| JP | 4576942 B2 | 11/2010 |
| JP | 2011-057767 A | 3/2011 |
| JP | 2011-516752 A | 5/2011 |
| JP | 5722732 B2 | 5/2015 |
| KR | 10-0296229 B1 | 10/2001 |
| KR | 20-0393967 Y1 | 8/2005 |
| KR | 10-2015-0003314 A | 1/2015 |
| KR | 10-1770118 B1 | 8/2017 |
| WO | 2009-124724 A1 | 10/2009 |

OTHER PUBLICATIONS

International Search Report Corresponding to PCT/KR2017/013694 dated Aug. 28, 2018.
Corresponding to PCT/KR2017/013694 dated Aug. 28, 2018Written Opinion.

APPARATUS AND METHOD FOR LAMINATING FIBERS FOR DIRECT MANUFACTURING OR PREFORM

BACKGROUND

1. Field

The following description relates generally to an apparatus for laminating fibers for manufacturing a preform which is an intermediate product of fiber reinforced plastics, and more particularly to an apparatus and method for laminating fibers for direct manufacturing of a preform, in which rows of fibers are drawn at the same time and are arranged in the form of a preform.

2. Description of the Related Art

Fiber Reinforced Plastics (FRPs), which are a composite material composed of a resin and reinforced fibers such as glass fibers, carbon fibers, or nylon fibers, are lightweight and have excellent strength, and thus are widely used in various industries.

Particularly, the FRPs, having mechanical properties of lightweight and excellent strength, are recently receiving attention as an automotive exterior material. Although a resin has excellent hardness but has low tensile strength, the resin may be reinforced with reinforced fibers, such that by using the resin as an automotive exterior material, the vehicle may be manufactured to be lightweight, and fuel efficiency may be improved.

As a method of manufacturing such FRPs, there is a method of laminating plate-shaped prepregs (formed by impregnating reinforced fibers with a matrix resin) on a mold, and forming the FRPs by heating and curing the resulting prepregs. By manually laminating the prepregs, the prepregs may be laminated in a desired shape, but the method has drawbacks in that as the prepregs become larger in size, a process time increases, and quality of products depends on competence of a manufacturer.

In order to solve the drawbacks, there is a method of automatically laminating the reinforced fibers, which includes: at the same time when laminating prepregs, formed by impregnating reinforced fibers with a resin, while pressurizing a mandrel surface, melting and fixing the resin impregnated by a separately provided heating device, an autoclave, and the like. However, as described above, the method requires high costs, and a large autoclave for accommodating large prepregs.

For this reason, instead of a forming method using prepregs, a method of resin transfer molding (RTM) is increasingly used to reduce the forming cycle, in which after preparing a fiber preform (formed only in a shape of fibers without filling a resin), the FRPs are manufactured by impregnating the fiber preform with a resin.

Figure 1:
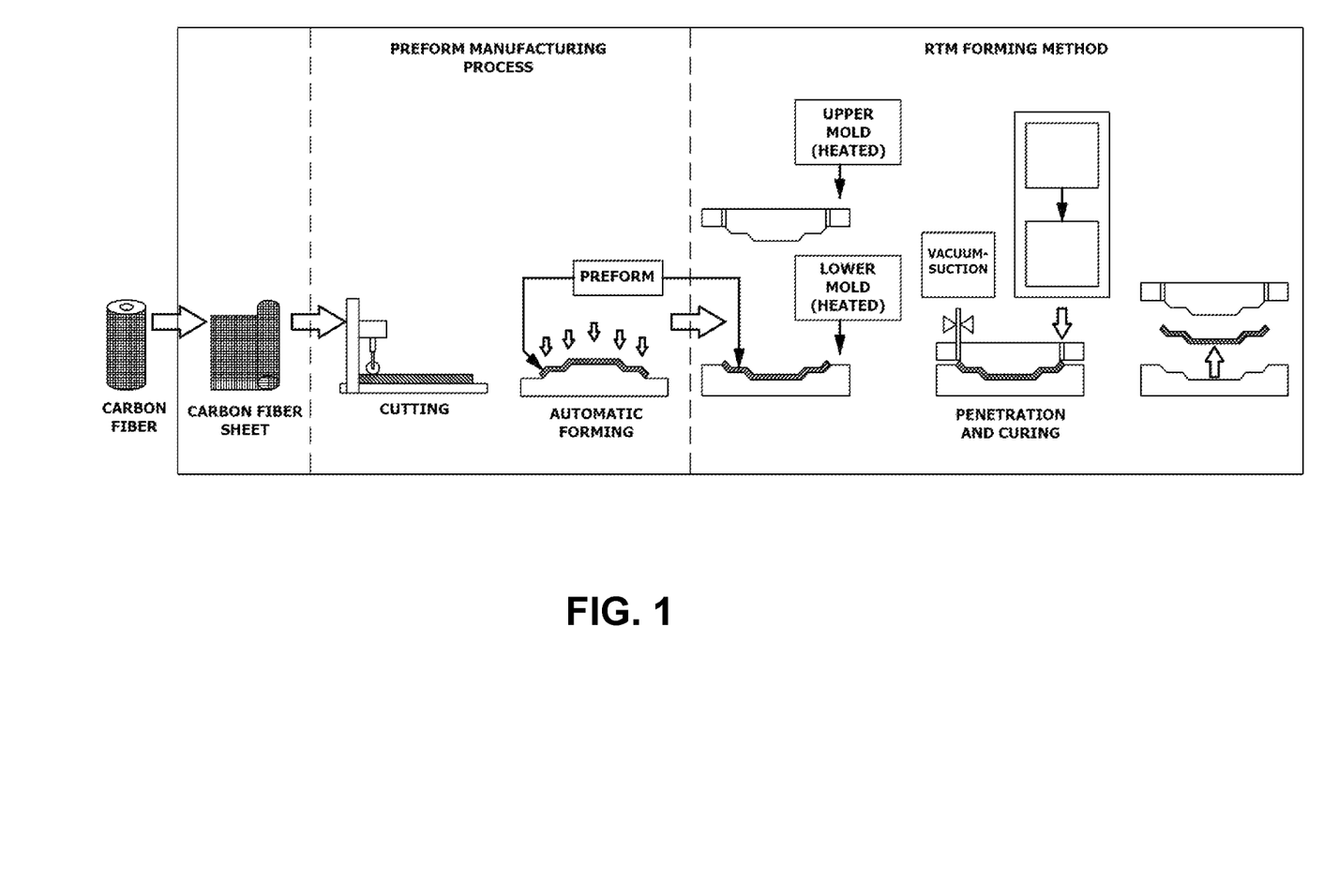
FIG. 1 is a diagram illustrating a process of manufacturing an automobile part using a Resin Transfer Molding (RTM) method.

FIG. 1 is a diagram illustrating a process of manufacturing an automobile part using a Resin Transfer Molding (RTM) method, which includes: forming fibers into a fiber sheet and cutting the fiber sheet; laminating the fiber sheets on a top surface of a workpiece formed in a shape, corresponding to a shape of a final formed product, to manufacture the preform; placing the preform between a heated upper mold and a heated lower mold, and injecting the resin into the mold at one side while pressurizing the resin, and at the other side, removing air existing between the upper mold and the lower mold by suctioning the air.

However, the RTM method has a drawback in that the method requires much time for operation as the fibers should be fixed to the workpiece at corner regions of the workpiece by using an adhesive or a separate device. Further, an adhesive applying part, a cooling part, a heating part, and a cutting part should be provided for every strand of fiber, such that a structure of an arrangement head (portion for laminating fibers on the workpiece) is complicated, and the arrangement head may be contaminated easily as the adhesive is repeatedly coagulated and melted in the arrangement head by the heating part.

SUMMARY

The present invention has been made to solve the above problems, and it is an object of the present disclosure to provide an apparatus and method for laminating fibers for direct manufacturing of a preform, in which at the same time when reinforced fibers are laminated to form a reinforced fiber preform, a plurality of strands may be arranged directly on a table, the reinforced fibers having a plurality of strands may be cut at the same time or one by one, and there is no need for a heating part.

It is another object of the present disclosure to provide an apparatus and method for laminating fibers for direct manufacturing of a preform, in which a robot for drawing the reinforced fibers and a robot for fixing the reinforced fibers operate separately, such that the reinforced fibers may be laminated rapidly and in a desired shape.

It is yet another object of the present disclosure to provide an apparatus and method for laminating fibers for direct manufacturing of a preform, in which when being drawn, the reinforced fibers remain dry, thereby minimizing contamination occurring when the reinforced fibers are drawn.

In accordance with one aspect of the present disclosure, the above objects are accomplished by providing an apparatus for laminating fibers for direct manufacturing of a preform, the apparatus supplying reinforced fibers to a table and laminating the reinforced fibers thereon, so as to manufacture a fiber preform by laminating the reinforced fibers on the table, the apparatus including: a reinforced fiber supply robot configured to supply a predetermined length of a plurality of reinforced fibers, on which a thermoplastic resin is coated; at least one or more edge fixing robots configured to press and fix an end of the reinforced fibers drawn from the reinforced fiber supply robot to the table while the reinforced fibers are adhered as the thermoplastic resin is melted, wherein the reinforced fiber supply robot may include: a plurality of reels, around which the reinforced fibers coated with the thermoplastic resin are wound; a plurality of supply rollers configured to transfer the reinforced fibers, drawn from the plurality of reels, to the table to supply the reinforced fibers thereto; a cutter configured to cut the reinforced fibers, supplied through the plurality of supply rollers, into a predetermined length; and a compression roller configured to press the end of the reinforced fibers, cut by the cutter, to the table.

In the reinforced fiber supply robot, a predetermined number of the plurality of reels may be installed on a same axis to form a reel unit, and the reel unit may be provided in plurality at positions spaced apart from each other, with axes of the reel units being disposed parallel to each other.

The plurality of supply rollers may combine the reinforced fibers, drawn from the reels of adjacent reel units, and may supply the combined reinforced fibers to the compression roller.

The cutter may be installed between the supply roller, through which the reinforced fibers finally pass among the plurality of supply rollers, and the compression roller.

The cutter may be provided, a number of which is equal to a number of the plurality of reinforced fibers, so as to cut each of the reinforced fibers independently from each other.

The cutter may be formed to have a width sufficient to cover all the plurality of reinforced fibers, so as to cut the plurality of reinforced fibers at the same time.

The compression roller may press all the reinforced fibers, drawn from the plurality of reels, to the table at the same time.

The compression roller may include a heating means.

The table may be installed at a top portion of a worktable which is movable on a transfer frame; the worktable may include a table position controller which rotates and tilts the table; and the table may include a heating means which melts a thermoplastic resin coated on the reinforced fibers.

The edge fixing robot may include a pressing part which presses the cut end of the reinforced fibers at an end portion of the robot arm, having a plurality of links and joints, to the table.

A plurality of edge fixing robots may be installed, which may be spaced apart from each other, wherein while any one edge fixing robot fixes the edge of the reinforced fibers supplied by the reinforced fiber supply robot to the table, the remaining edge fixing robot may remain separated from the table, so that the reinforced fibers may be supplied to the table from the reinforced fiber supply robot.

The apparatus for laminating fibers for direct manufacturing of a preform may further include an unloading robot which is formed at one end of the transfer frame, and supplies the formed reinforced fiber preform from the table to a forming part which performs a subsequent process of impregnating the reinforced fiber preform with a resin.

In accordance with another aspect of the present disclosure, the above objects are accomplished by providing a method of laminating fibers for direct manufacturing of a preform using an apparatus for laminating fibers, the apparatus including a reinforced fiber supply robot configured to supply a predetermined length of a plurality of reinforced fibers, on which a thermoplastic resin is coated, and a plurality of edge fixing robots configured to press and fix an end of the reinforced fibers, drawn from the reinforced fiber supply robot, to the table while the reinforced fibers are adhered as the thermoplastic resin is melted, and the method including: a) drawing the reinforced fibers, wound around each of a plurality of reels, and setting an end of each of the reinforced fibers at a predetermined position of the reinforced fiber supply robot; b) drawing a predetermined length of the reinforced fibers from the reinforced fiber supply robot to the table; c) by any one of the plurality of edge fixing robots, fixing the end of the reinforced fibers to the table; d) by a cutter provided in the reinforced fiber supply robot, cutting the reinforced fibers at a position where the reinforced fibers are fully drawn; e) while any one of the edge fixing robots fixes the end of the reinforced fibers, drawing the reinforced fibers to the table by the reinforced fiber supply robot; f) by the remaining edge fixing robot among the plurality edge fixing robots, fixing the end of the reinforced fibers to the table; g) by the cutter provided in the reinforced fiber supply robot, cutting the reinforced fibers at a position where the reinforced fibers are fully drawn; and repeating the b) to g) until there is no remaining reinforced fibers wound around the plurality of reels.

In the d) or g), the plurality of reinforced fibers may be cut separately one by one.

In the d) or g), the plurality of reinforced fibers may be cut at the same time.

The b) to g) may be performed while the table is maintained at an elevated temperature.

Effects of the Invention

As described above, according to the apparatus and method for laminating fibers for direct manufacturing of a preform of the present disclosure, at the same time when reinforced fibers are laminated to form a reinforced fiber preform, a plurality of strands may be arranged directly on a table, thereby rapidly forming the reinforced fiber preform.

Further, by separately operating the robot for drawing the reinforced fibers and the robot for fixing the reinforced fibers, the reinforced fibers may be laminated rapidly; and by adjusting an amount of drawing of the reinforced fibers, the reinforced fibers may be laminated in a desired shape.

Moreover, the plurality of strands of the reinforced fibers may be cut at the same time.

In addition, a portion for applying a thermoplastic resin is not required, such that when being drawn, the reinforced fibers remain dry, thereby minimizing contamination occurring when the reinforced fibers are drawn; and there is no need for a heating part, thereby minimizing the structure and facilitating maintenance.

DETAILED DESCRIPTION

The above and other aspects of the invention will become apparent from the following detailed description of preferred embodiments. Throughout the drawings and the detailed description, like reference numerals in the drawings denote like elements. Further, the relative size and depiction of these elements may be exaggerated for clarity, illustration, and convenience. In the following description, a detailed description of known functions and configurations incorporated herein will be omitted when it may obscure the subject matter of the present disclosure.

Hereinafter, an apparatus for laminating fibers for direct manufacturing of a preform according to the present disclosure will be described in detail with reference to the accompanying drawings.

Figure 2:
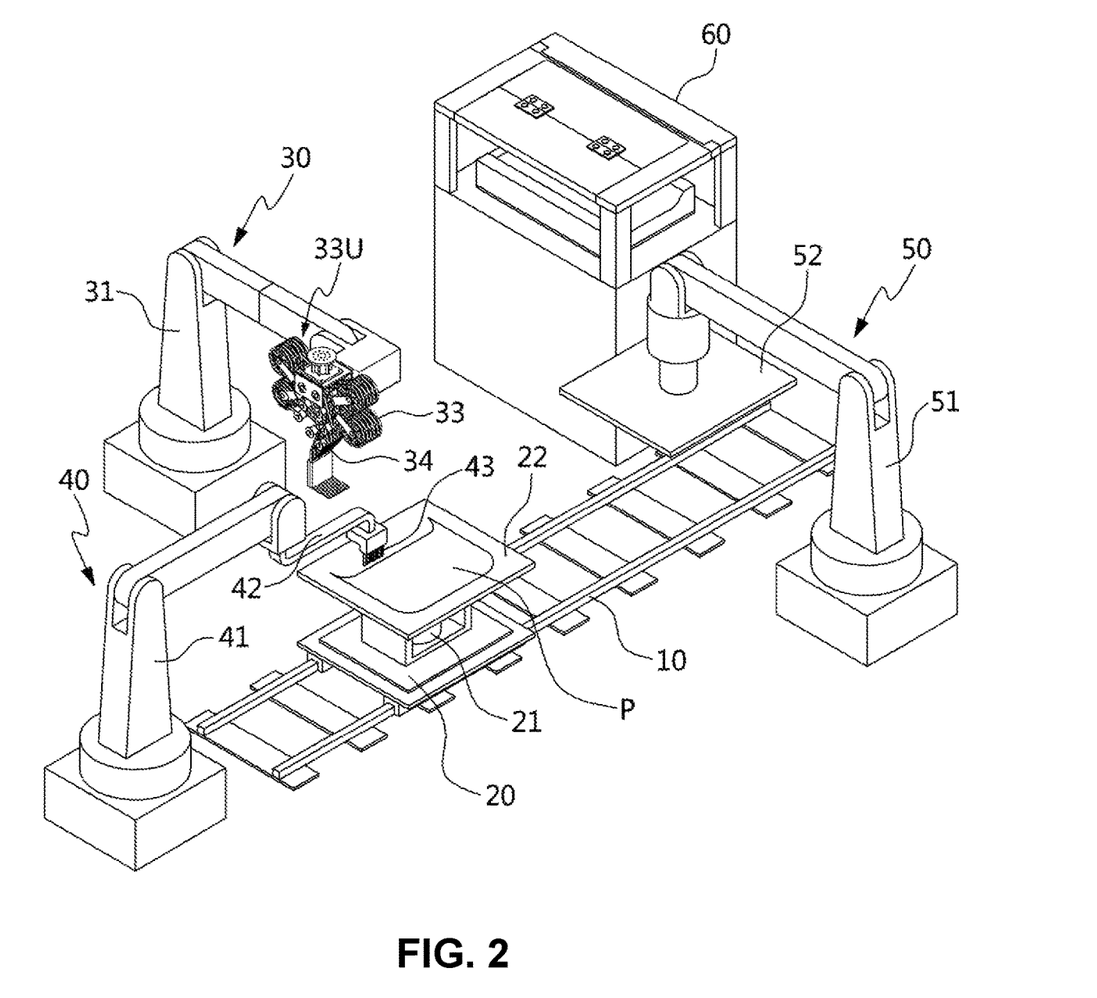
FIG. 2 is a schematic view of an apparatus for laminating fibers for direct manufacturing of a preform according to an embodiment of the present disclosure.
Figure 3:
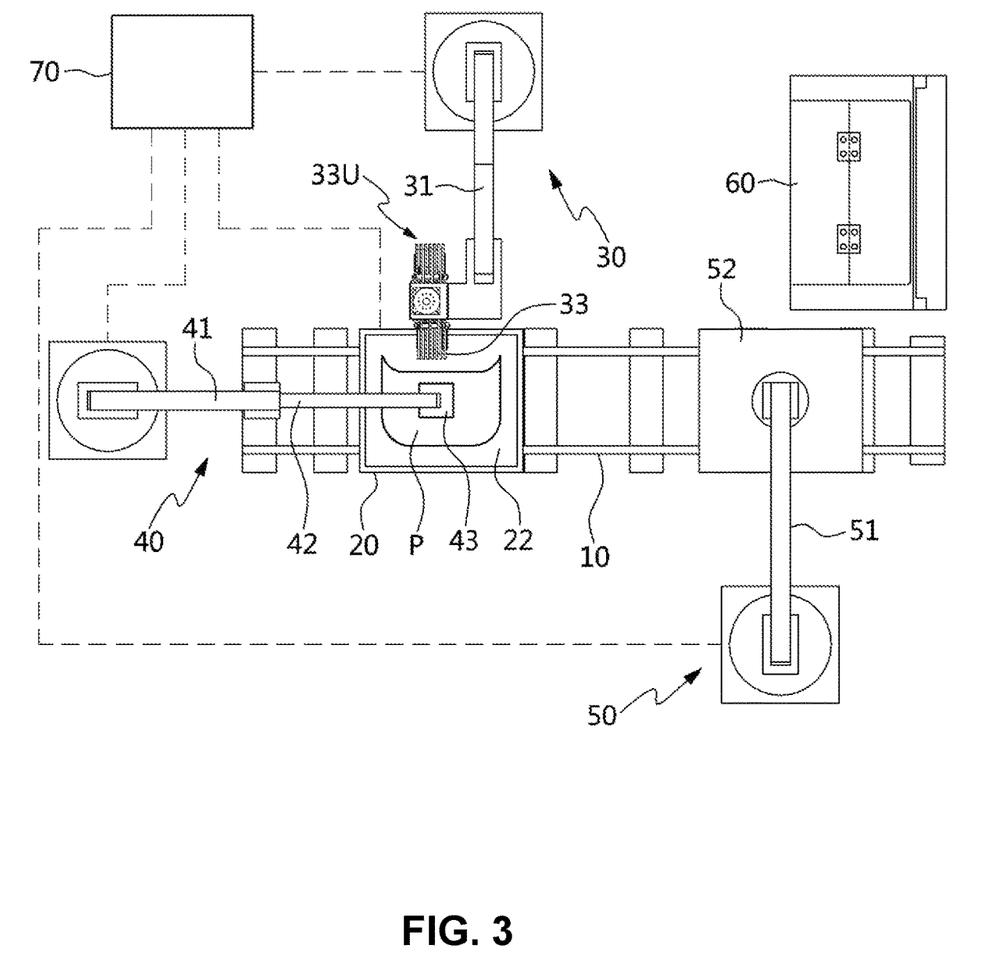
FIG. 3 is a plan view of an apparatus for laminating fibers for direct manufacturing of a preform according to an embodiment of the present disclosure.

FIGS. 2 and 3 each are a schematic view and a plan view of an apparatus for laminating fibers for direct manufacturing of a preform according to an embodiment of the present disclosure.

As illustrated in FIGS. 2 and 3, the apparatus for laminating fibers for direct manufacturing of a preform according to an embodiment of the present disclosure includes: a worktable 20, a reinforced fiber supply robot 30, an edge fixing robot 40, an unloading robot 50 which supplies a formed fiber preform to a subsequent process, and a controller 70 which controls these components.

The worktable 20 slides on a transfer frame 10 to transfer the fiber preform P, formed on the worktable 20, to a subsequent process.

Once the reinforced fiber preform P is completed on the worktable 20, the worktable 20 transfers the completed preform P to a predetermined position, and then returns to its original position.

A table 22, which provides a space for forming the reinforced fiber preform P, is installed at a top portion of the worktable 20. The table 22 has a top surface which is preferably formed to be a flat surface having a predetermined area. When the table 22 is installed at the worktable 20, the table 22 is installed through a table position controller 21, so as to be rotated and tilted with respect to the worktable 20. Further, the table 22 has a heating means, e.g., a heat wire, such that while the reinforced fiber preform P is formed, the table 22 may be maintained at an elevated temperature. When the reinforced fiber preform P is formed, the table 22 is maintained at an elevated temperature, such that a thermoplastic resin coated on the surface of the reinforced fibers F may be melted. In addition, since the heating means is provided at the table 22, a structure of the reinforced fiber supply robot 30 may be simplified compared to a case where the heating means is installed at the reinforced fiber supply robot 30, thereby facilitating maintenance of the reinforced fiber supply robot 30.

The reinforced fiber supply robot 30 includes an arrangement head which supplies reinforced fibers to an end portion of a robot arm 31. Once the position of the robot arm 31 is determined in the reinforced fiber supply robot 30, the arrangement head supplies a predetermined length of the reinforced fibers F to the table 22.

The robot arm 31 includes a plurality of links and joints, allowing the end portion of the robot arm 31 to move to a desired position in a space. The technology of the robot arm 31 is commonly known in the art, such that a detailed description thereof will be omitted. A structure, such as a frame, is installed at the end portion of the robot arm 31, such that components which will be described below may be installed at the frame.

Figure 4:
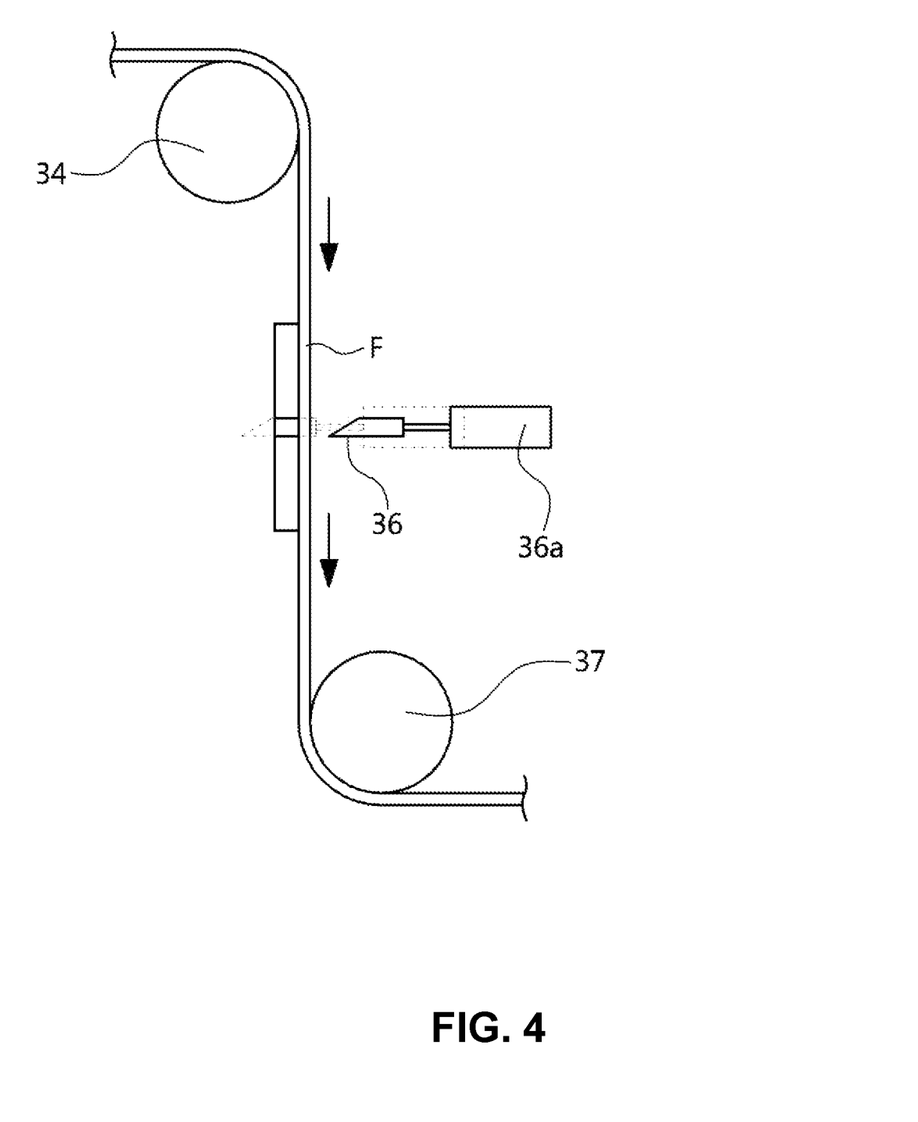
FIG. 4 is a side view of a bottom portion of a reinforced fiber supply robot in an apparatus for laminating fibers for direct manufacturing of a preform according to an embodiment of the present disclosure.

Here, the arrangement head includes: a plurality of reels 33, around which the reinforced fibers F are wound, a plurality of supply rollers 34 which draw the reinforced fibers F from the plurality of reels 33 to supply the reinforced fibers; a cutter 36 which cuts the reinforced fibers F into a predetermined length; and a compression roller 37 which presses the cut reinforced fibers F to the table 22.

The reels 33 are provided in plurality, and the reinforced fibers F, on which a thermoplastic resin is coated, are wound around each of the reels 33.

The reinforced fibers F are preprocessed by coating the thermoplastic resin on the surface of the reinforced fibers F and drying, such that the reinforced fibers F become dried. Further, the reinforced fibers F may be processed into the form of a tape to be easily wound around and drawn from the reels 33. For example, the reinforced fibers F may be processed into the form of a tape by arranging a plurality of reinforced fibers F on a plane, and by attaching the reinforced fibers together using a thermoplastic resin.

A predetermined number of the reels 33 are installed on the same axis at positions spaced apart from each other to form a reel unit 33U, and a plurality of these reel units 33U are disposed separated from each other. For example, three reels 33 may form one reel unit 33U, and four such reel units 33U are disposed, such that the reinforced fibers F may be supplied simultaneously from twelve reels 33 in the reinforced fiber supply robot 30. Here, the number of reels 33 forming the reel unit 33U, and the number of reel units 33U installed in the reinforced fiber supply robot 30 may be adjusted to a desired number according to need.

The reel units 33U are spaced apart from each other, and the axes of the reel units 33U are disposed parallel to each other. Accordingly, all the reels 33 installed in the reinforced fiber supply robot 30 are preferably disposed parallel to each other.

The supply rollers 34 are installed in plurality to supply the reinforced fibers F drawn from each of the reels 33 to the table 22. A driving motor, such as a sub-motor, is installed at one side of each of the supply rollers 34 to rotate the supply rollers 34, allowing the reinforced fibers F to be supplied to the table 22 from the reels 33.

A plurality of supply rollers 34 are installed in the frame, in which the reinforced fibers F drawn from adjacent reel units 33U pass through the plurality of supply rollers 34 to be combined and supplied to the table 22. For example, the reinforced fibers F, drawn from two adjacent reel units 33U, are primarily gathered, and then are secondarily combined with reinforced fibers drawn from the remaining two reel units 33U, to be supplied to the table 22.

The supply rollers 34 are disposed to allow the table 22 to supply the reinforced fibers from the plurality of reels 33, and a specific position of the supply rollers 34 may be properly changed.

In this case, a rotation axis of the plurality of supply rollers 34 and a rotation axis of the plurality of reels 33 are disposed parallel to each other. As the rotation axes of the plurality of supply rollers 34 and the rotation axes of the plurality of reels 33 are disposed parallel to each other, the reinforced fibers F drawn from the reels 33 may be supplied without being twisted.

The cutter 36 cuts the reinforced fibers F, having passed through a last supply roller 34 among the plurality of supply rollers 34. The cutter 36 reciprocates perpendicularly to a running direction of the reinforced fibers F, such that when a cutting signal is input to a cutter actuator 36, the cutter 36 cuts the reinforced fibers F.

The cutter 36 may be provided, the number of which may be equal to the number of the reels 33 to cut each of the reinforced fibers F; or the cutter 36 may be formed to have a width corresponding to a width of a plurality of reinforced fibers F, so as to cut the plurality of the reinforced fibers F passing through the cutter 36 at the same time. That is, when the cutters 36 are provided in the same number as the number of reels 33 to cut each of the reinforced fibers F, each of the reinforced fibers F is cut separately one by one by the cutter 36. Alternatively, in the case where the cutter 36 is formed to have a width sufficient to cover all the plurality of reinforced fibers F, the cuter 36 may cut the reinforced fibers F at the same time.

The compression roller 37 is installed at a lowermost end of the reinforced fiber supply robot 30. The compression roller 37 compresses the reinforced fibers F, drawn from the plurality of reels 33, to the table 22, so that the reinforced fibers F may have tension by the last supply roller 34, among the supply rollers 34, and the compression roller 37. Further, the cutter 36 is disposed on the last supply roller 34 and the compression roller 37 to facilitate cutting of the cutter 36. Particularly, the compression roller 37 includes a heating means, such that when the reinforced fibers F are compressed to the table 22, the reinforced fibers F may be compressed at an elevated temperature not only by pressure but also by heat.

The edge fixing robot 40 presses and fixes the end of the reinforced fibers F which are supplied by the reinforced fiber supply robot 30 to the table 22.

The edge fixing robot 40 includes a robot arm 41 including a plurality of links and joints; and a pressing part 43 which presses the reinforced fibers F at the end of the robot arm 41 to the table 22.

Similarly to the robot arm 31 of the reinforced fiber supply robot 30 described above, the robot arm 41 includes a plurality of links and joints, allowing the end portion of the robot arm 41 to move to a desired position.

While the reinforced fibers F are adhered to the table 22, the pressing part 43 presses the end of the reinforced fibers F to the table 22 to firmly adhere the reinforced fibers F thereto. The pressing part 43 may be connected to the robot arm 41 by a fixing jig 42.

The reinforced fibers F are coated with a thermoplastic resin, and the table 22 is at an elevated temperature, such that when the pressing part 43 presses the reinforced fibers F to the table 22, the reinforced fibers F may be adhered to the table 22.

Figure 5:
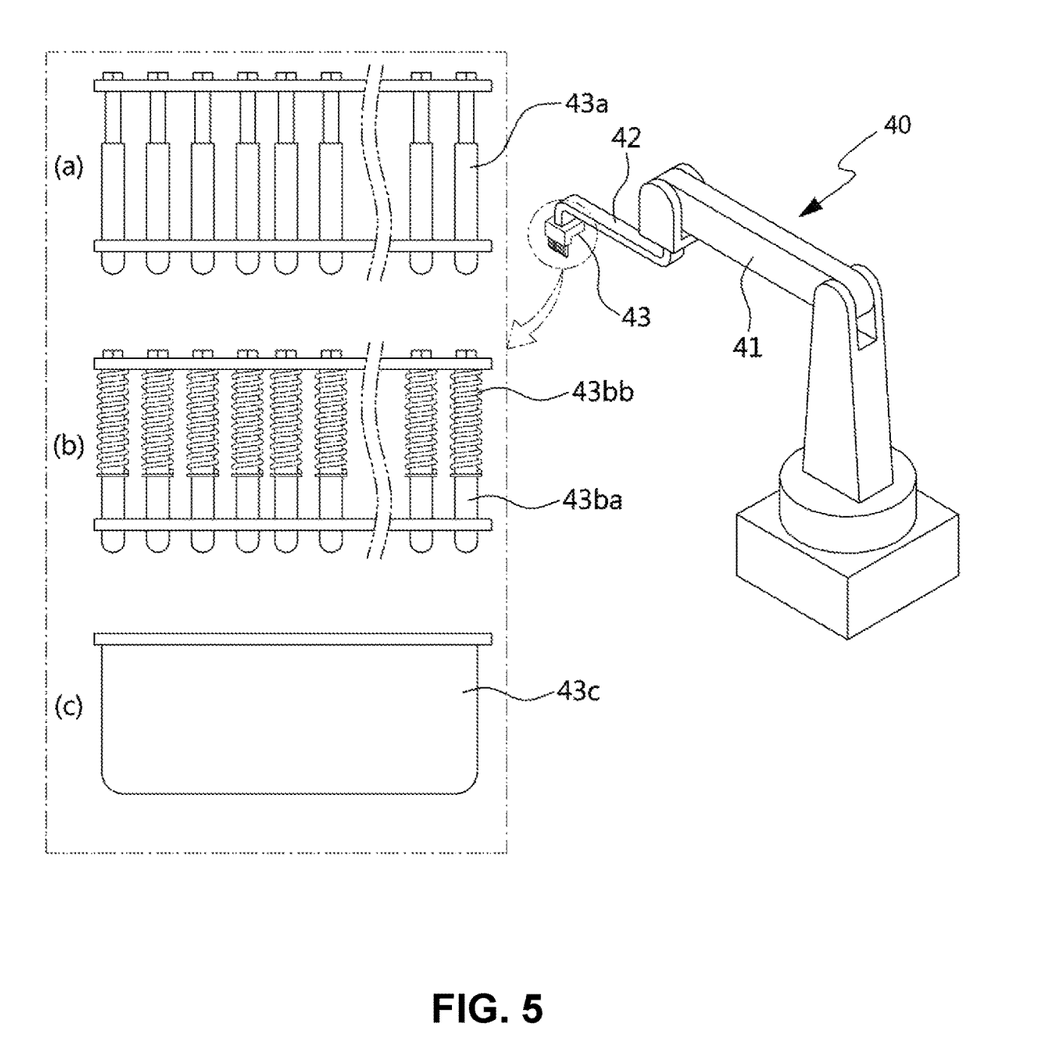
FIG. 5 is a diagram illustrating examples (a) to (c) of the pressing part of the edge fixing robot in an apparatus for laminating fibers for direct manufacturing of a preform according to an embodiment of the present disclosure.

FIG. 5 illustrates examples (a) to (c) of the pressing part 43.

An example of the pressing part 43 may be a piston 43a which is raised or lowered by hydraulic pressure or pneumatic pressure, or according to an electric signal, as illustrated in (a) of FIG. 5.

Further, the pressing part 43 may be a pusher 43ba which is elastically supported by a spring 43bb and presses the reinforced fibers F (see (b) of FIG. 5).

In addition, the pressing part 43 may be an air balloon 43c which expands by the supply of air, as illustrated in (c) of FIG. 5.

Figure 6:
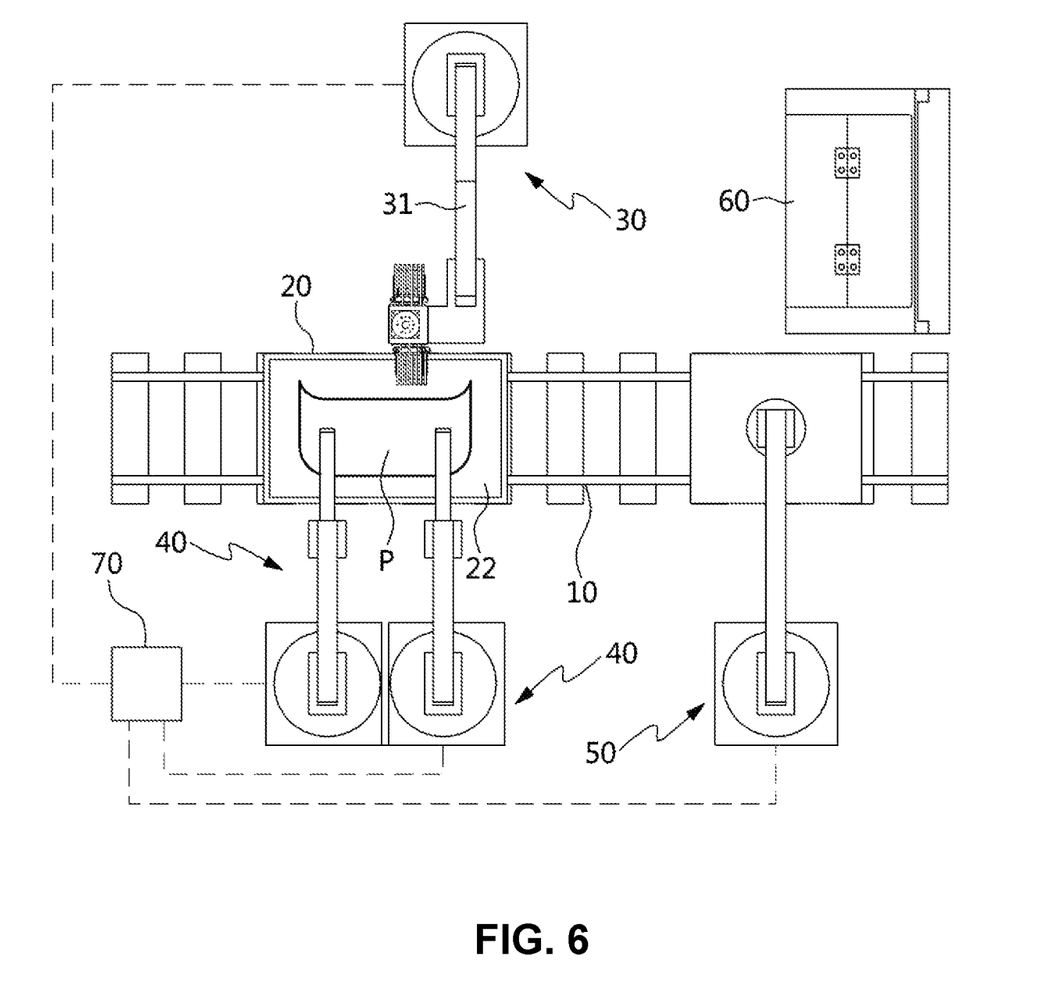
FIG. 6 is a plan view of an apparatus for laminating fibers for direct manufacturing of a preform according to another embodiment of the present disclosure.

Only one edge fixing robot 40 may be installed, but a plurality of edge fixing robots 40 may be preferably installed. That is, as illustrated in FIG. 6, in the case where two edge fixing robots 40 are installed, when any one of the edge fixing robots 40 fixes the end of the reinforced fibers F supplied from the reinforced fiber supply robot 30, the reinforced fiber supply robot 30 supplies the reinforced fibers F by drawing the reinforced fibers F to the table 22. In this case, the other edge fixing robot 40, which is separated from the table 22, is on standby; and when the reinforced fiber supply robot 40 supplies the reinforced fibers F to the table 22, the other edge fixing robot 40 newly presses the end of the reinforced fibers F, and the any one edge fixing robot 40 becomes separated from the table 22. By repeating the process, the two edge fixing robots 40 may alternately fix the end of the reinforced fibers F, thereby improving the speed of operation.

Further, in the case where a plurality of edge fixing robots 40 are installed, the edge fixing robots 40 may be disposed parallel to each other as illustrated in FIG. 8, but may also be disposed vertical to each other.

The unloading robot 50 is composed of a robot arm 51 and a holder 52, such that the unloading robot 50 may unload a reinforced fiber preform P from the table 22 after the reinforced fiber preform P is completely formed on the table 22 and is transferred therefrom, and may supply the reinforced fiber preform P to a forming part 60, so that the forming part 60 may perform a subsequent process. In this case, the subsequent process is a process of impregnating the reinforced fiber preform P with a resin, to prepare fiber reinforced plastics (FRP).

The controller 70 is electrically connected to the worktable 20, the reinforced fiber supply robot 30, the edge fixing robot 40, and the unloading robot 50, and outputs signals required for operation of each of the components, to operate the apparatus for laminating fibers for direct manufacturing of a preform according to the present disclosure. The controller 70 has logic for a method of laminating fibers for direct manufacturing of a preform, which will be described below, and the controller 70 operates the apparatus for laminating fibers according to the logic.

The method of laminating fibers for direct manufacturing of a preform according to the present disclosure will be described below.

Figure 7:
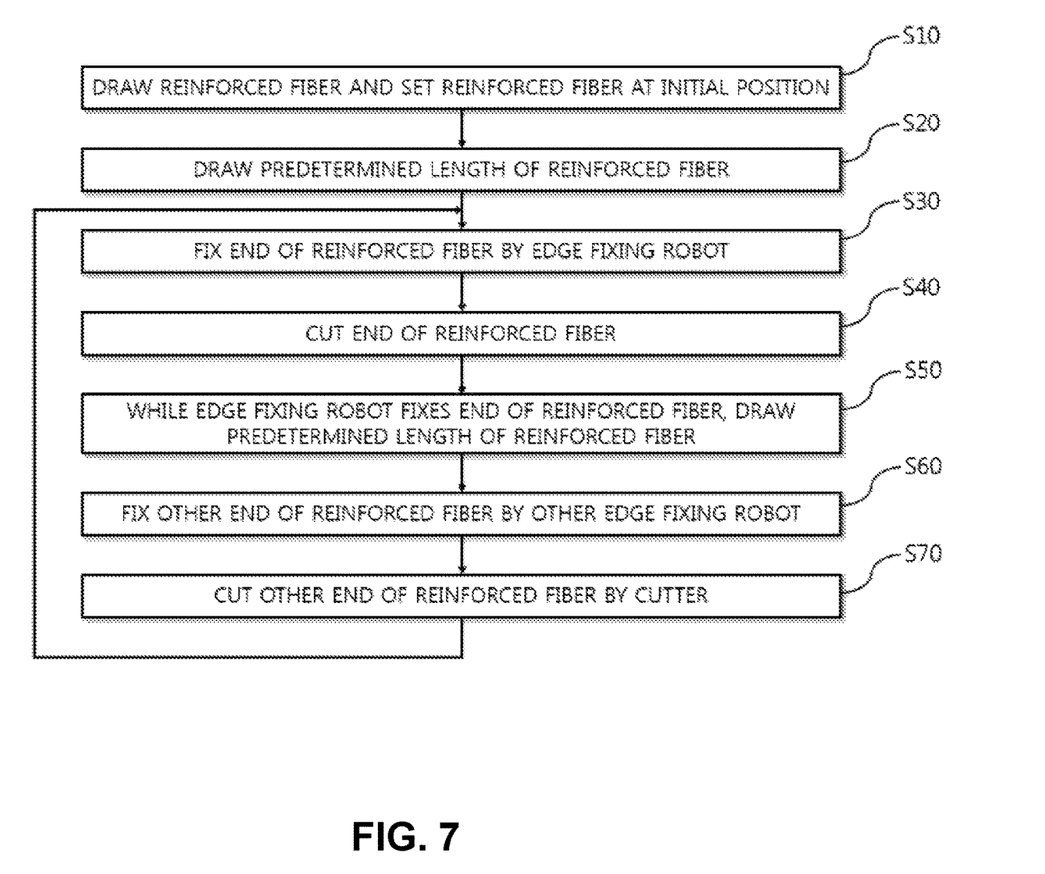
FIG. 7 is a flowchart illustrating a method of laminating fibers for direct manufacturing of a preform according to an embodiment of the present disclosure.

The method of laminating fibers for direct manufacturing of a preform according to the present disclosure is performed by the apparatus for laminating fibers for direct manufacturing of a preform described above, and according to a sequence illustrated in FIG. 7.

First, the reinforced fiber supply robot 30 is loaded with the reel 33, around which the reinforced fibers F coated with a thermoplastic resin is wound. As a plurality of reels 33 may be installed in the reinforced fiber supply robot 30, the reels 33 are installed at every position where the reels 30 may be installed. The reinforced fibers F are preprocessed by coating a thermoplastic resin on the surface of the reinforced fibers F and drying, and are preferably processed into the form of a tape and wound around the reels 33, so as to be loaded in the reinforced fiber supply robot 30.

Then, each of the reinforced fibers F wound around the plurality of reels 33, is drawn to be set at a predetermined initial position of the reinforced fiber supply robot 30 in S10. For example, the end of the reinforced fibers F may be set to be positioned at the compression roller 37.

While moving above the table 22, the reinforced fiber supply robot 30 draws a predetermined length of the reinforced fibers F in S20. While being drawn from the reinforced fiber supply robot 30, the reinforced fibers F are primarily compressed by the compression roller 37 to the table 22. When the reinforced fibers F are primarily compressed by the compression roller 37 to the table 22, the reinforced fibers F may be compressed by either one of pressure and heat, but are preferably compressed by both pressure and heat.

Once a predetermined length of the reinforced fibers F are drawn by the reinforced fiber supply robot 30, any one of the edge fixing robots 40 compresses the end (a portion which is completely drawn) of the reinforced fibers F to the table 22 and fixes the end of the reinforced fibers F in S30.

Subsequently, the cutter 36, provided in the reinforced fiber supply robot 30, cuts the reinforced fibers F at a position where the reinforced fibers F are fully drawn in S40. Even when the reinforced fibers F are cut, the cut end of the reinforced fibers F is not separated from the table 22 by the edge fixing robot 40.

While the edge fixing robot 40 fixes the reinforced fibers F, a predetermined length of the reinforced fibers F is drawn from the reinforced fiber supply robot 30 to the table 22 in S50.

Next, the other edge fixing robot 40 among the plurality of edge fixing robots 40 compresses the end of the reinforced fibers F to the table 22 to fix the other end of the reinforced fibers F in S60, and the cutter 36 cuts the fixed reinforced fibers in S70.

The processes S30 to S70 are repeated until there is no remaining reinforced fibers F wound around each of the reels 33, to form a reinforced fiber preform on the table 22. While the processes S30 and S70 are repeated, the reinforced fibers F are drawn onto the table 22 during the processes S20 to S50, to form the reinforced fiber preform P.

While the processes S20 to S50 are repeated, the length of the reinforced fibers F drawn from the reinforced fiber supply robot 30 may be set differently according to a shape of the reinforced fiber preform. In the case where the reinforced fiber preform has a simple rectangular shape, the lengths of the reinforced fibers F drawn in S20 and S50 may be equal to each other, but for other shapes, the lengths of the reinforced fibers F drawn in S20 and S50 may be set differently.

The formed reinforced fiber preform is transferred to a subsequent process, to be impregnated with a resin and processed into fiber reinforced plastics (FRP).

By manufacturing the reinforced fiber preform P using the method described above, the preform P may be formed in a desired shape on the table 22. Further, while the drawing of the reinforced fibers F is repeated, the amount of drawing may be set differently, such that the reinforced fiber preform P may be manufactured in a desired shape.

In addition, by providing a plurality of edge fixing robots 40, which may alternately fix the reinforced fibers drawn onto the table 22, the speed of operation may be improved, thereby increasing productivity.

While the present disclosure is described with reference to the examples as illustrated in the drawings, it should be understood by those skilled in the art that the foregoing is exemplary only, and that various modifications and equivalent changes may be made thereto, and thus the scope of the invention is defined only by the appended claims.

What is claimed is:

1. An apparatus for laminating fibers for direct manufacturing of a preform, the apparatus supplying reinforced fibers to a table and laminating the reinforced fibers thereon so as to manufacture a fiber preform by laminating the reinforced fibers on the table, the apparatus comprising:
   a reinforced fiber supply robot configured to supply a predetermined length of a plurality of reinforced fibers, on which a thermoplastic resin is coated;
   at least one or more edge fixing robots configured to press and fix an end of the reinforced fibers, drawn from the reinforced fiber supply robot to the table, while the reinforced fibers are adhered as the thermoplastic resin is melted;
   wherein the reinforced fiber supply robot comprises:
   a plurality of reels around which the reinforced fibers coated with the thermoplastic resin are wound;
   a plurality of supply rollers configured to transfer the reinforced fibers, drawn from the plurality of reels, to the table to supply the reinforced fibers thereto;
   a cutter configured to cut the reinforced fibers, supplied through the plurality of supply rollers, into a predetermined length;
   a compression roller configured to press the end of the reinforced fibers, cut by the cutter, to the table;
   the table is installed at a top portion of a worktable which is movable on a transfer frame;
   the worktable comprises a table position controller which rotates and tilts the table; and
   the table comprises a heating wire which melts the thermoplastic resin coated on the reinforced fibers.

2. The apparatus of claim 1, wherein in the reinforced fiber supply robot, a predetermined number of the plurality of reels are installed along a same axis to form at least first and second reel units, and the at least first and second reel units are spaced apart from each other, with axes of the at least first and second reel units being disposed parallel to each other.

3. The apparatus of claim 2, wherein the plurality of supply rollers combine the reinforced fibers, drawn from the reels of adjacent reel units, and supplies the combined reinforced fibers to the compression roller.

4. The apparatus of claim 3, wherein the cutter is installed between the supply roller, through which the reinforced fibers finally pass among the plurality of supply rollers, and the compression roller.

5. The apparatus of claim 1, wherein the cutter comprises a plurality of cutters, and a number of the plurality of cutters is equal to a number of the plurality of reinforced fibers, so as to cut each of the reinforced fibers independently from each other.

6. The apparatus of claim 1, wherein the cutter is formed to have a width sufficient to cover all the plurality of reinforced fibers so as to cut the plurality of reinforced fibers at the same time.

7. The apparatus of claim 4, wherein the compression roller presses all of the reinforced fibers, drawn from the plurality of reels, to the table at the same time.

8. The apparatus of claim 1, wherein the compression roller comprises a heating wire.

9. The apparatus of claim 1, wherein the edge fixing robot comprises a pressing part which presses the cut end of the reinforced fibers at an end portion of the robot arm to the table, and the robot arm has a plurality of links and joints.

10. The apparatus of claim 1, wherein a plurality of edge fixing robots are installed spaced apart from each other, and while a first one of the plurality of edge fixing robot fixes the edge of the reinforced fibers supplied by the reinforced fiber supply robot to the table, and a remainder of the plurality of edge fixing robot remain remain separated from the table so that the reinforced fibers are supplied to the table from the reinforced fiber supply robot.

11. The apparatus of claim 1, further comprising an unloading robot which is formed at one end of the transfer frame, and supplies the formed reinforced fiber preform from the table to a forming part which performs a subsequent process of impregnating the reinforced fiber preform with a resin.

12. An apparatus for laminating fibers for direct manufacturing of a preform, the apparatus supplying reinforced fibers to a table and laminating the reinforced fibers thereon so as to manufacture a fiber preform by laminating the reinforced fibers on the table, the apparatus comprising:
   a reinforced fiber supply robot configured to supply a predetermined length of a plurality of reinforced fibers, on which a thermoplastic resin is coated;
   at least one or more edge fixing robots configured to press and fix an end of the reinforced fibers, drawn from the reinforced fiber supply robot to the table, while the reinforced fibers are adhered as the thermoplastic resin is melted;

wherein the reinforced fiber supply robot comprises:
a plurality of reels around which the reinforced fibers coated with the thermoplastic resin are wound;
a plurality of supply rollers configured to transfer the reinforced fibers, drawn from the plurality of reels, to the table to supply the reinforced fibers thereto;
a cutter configured to cut the reinforced fibers, supplied through the plurality of supply rollers, into a predetermined length;
a compression roller configured to press the end of the reinforced fibers, cut by the cutter, to the table; and
the edge fixing robot comprises a robot arm which has a plurality of links and joints, and an end portion of the robot arm has a pressing part which presses the cut end of the reinforced fibers against the table.

13. The apparatus of claim 12, wherein in the reinforced fiber supply robot, a predetermined number of the plurality of reels are installed along a same axis to form at least first and second reel units, and the at least first and second reel units are spaced apart from each other, with axes of the at least first and second reel units being disposed parallel to each other.

14. The apparatus of claim 13, wherein the plurality of supply rollers combine the reinforced fibers, drawn from the reels of adjacent reel units, and supplies the combined reinforced fibers to the compression roller.

15. The apparatus of claim 14, wherein the cutter is installed between the supply roller, through which the reinforced fibers finally pass among the plurality of supply rollers, and the compression roller.

16. The apparatus of claim 12, wherein the cutter comprises a plurality of cutters, and a number of the plurality of cutters is equal to a number of the plurality of reinforced fibers, so as to cut each of the reinforced fibers independently from each other.

17. apparatus of claim 12, wherein the cutter is formed to have a width sufficient to cover all the plurality of reinforced fibers so as to cut the plurality of reinforced fibers at the same time.

18. apparatus of claim 15, wherein the compression roller presses all of the reinforced fibers, drawn from the plurality of reels, to the table at the same time.

19. The apparatus of claim 12, wherein the compression roller comprises a heating wire.

20. The apparatus of claim 12, wherein a plurality of edge fixing robots are installed spaced apart from each other,
while a first one of the plurality of edge fixing robot fixes the edge of the reinforced fibers supplied by the reinforced fiber supply robot to the table, and a remainder of the plurality of edge fixing robot remain remain separated from the table so that the reinforced fibers are supplied to the table from the reinforced fiber supply robot, and
the apparatus further comprising an unloading robot which is formed at one end of the transfer frame, and supplies the formed reinforced fiber preform from the table to a forming part which performs a subsequent process of impregnating the reinforced fiber preform with a resin.

* * * * *

UNITED STATES PATENT AND TRADEMARK OFFICE
CERTIFICATE OF CORRECTION

| | | |
|---|---|---|
| PATENT NO. | : 11,491,745 B2 | |
| APPLICATION NO. | : 16/463410 | |
| DATED | : November 8, 2022 | |
| INVENTOR(S) | : Hyun Deuk Kim and Seon Hee Yoon | |

It is certified that error appears in the above-identified patent and that said Letters Patent is hereby corrected as shown below:

In the Claims

Column 10, Line 48, Claim 10, the text "remain remain" should read --remain--.

Column 12, Line 21, Claim 20, the text "remain remain" should read --remain--.

Signed and Sealed this
Tenth Day of January, 2023

Katherine Kelly Vidal
*Director of the United States Patent and Trademark Office*